UNITED STATES PATENT OFFICE.

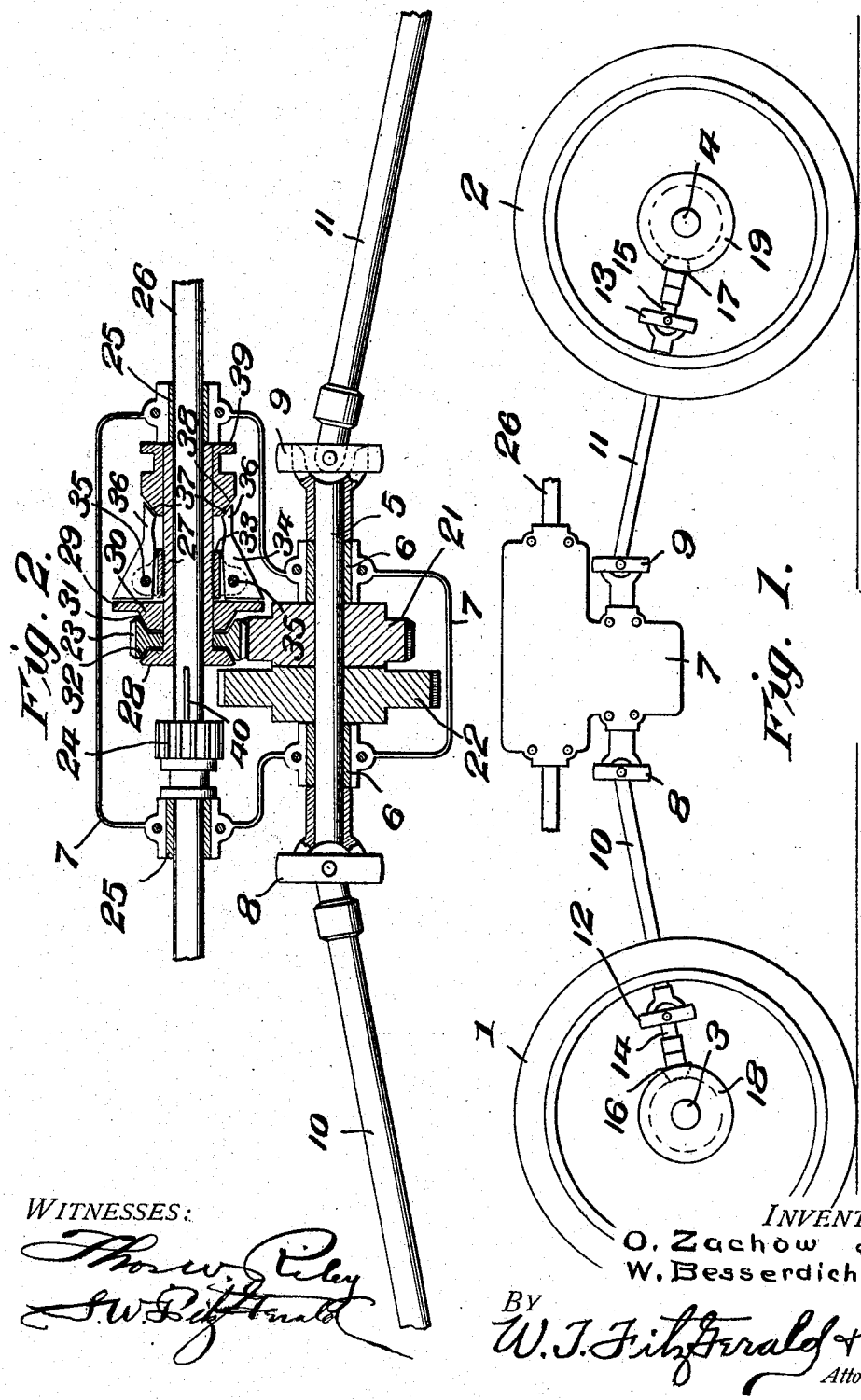

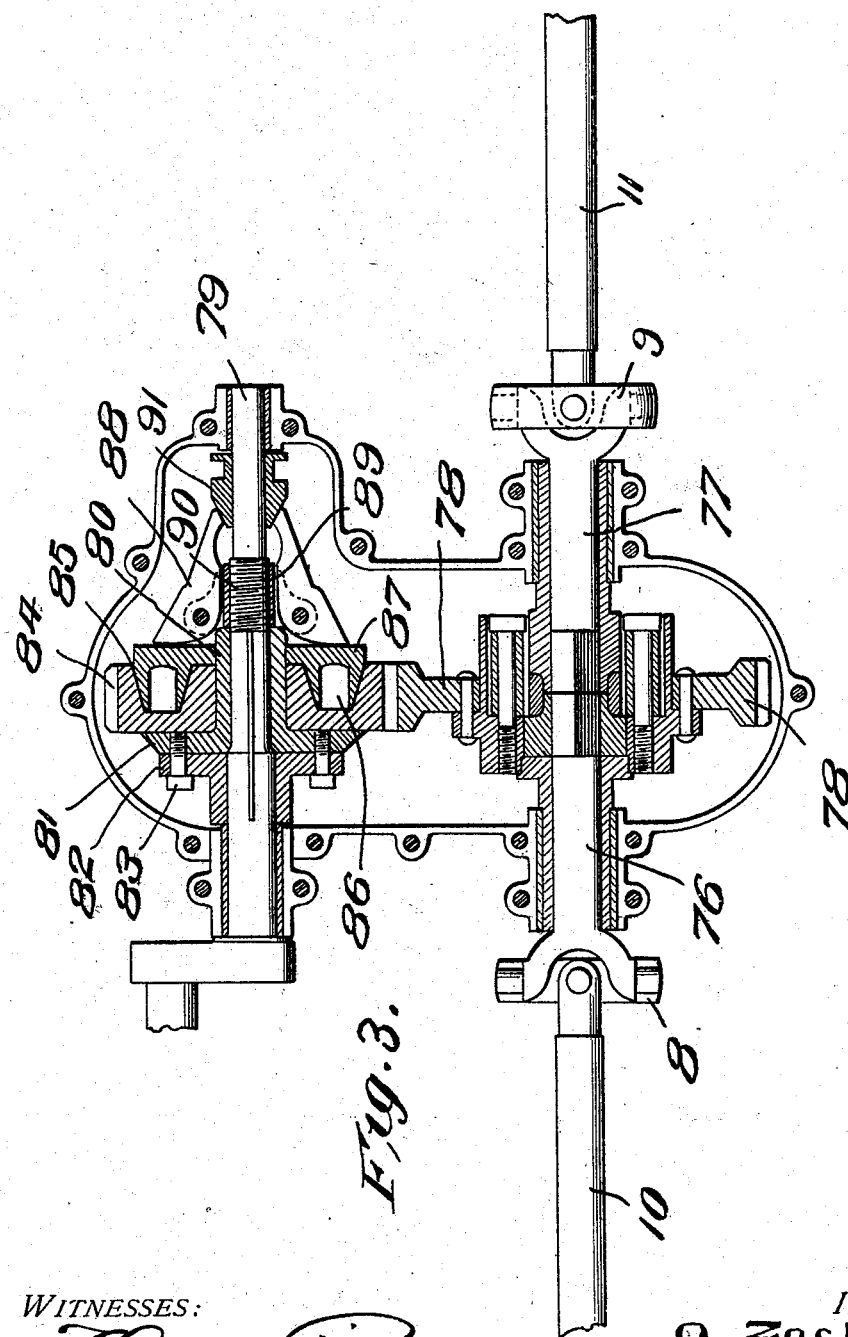

OTTO ZACHOW AND WILLIAM BESSERDICH, OF CLINTONVILLE, WISCONSIN.

POWER-APPLYING MECHANISM.

No. 907,940.  Specification of Letters Patent.  Patented Dec. 29, 1908.

Application filed July 17, 1907. Serial No. 384,197.

*To all whom it may concern:*

Be it known that we, OTTO ZACHOW and WILLIAM BESSERDICH, citizens of the United States, residing at Clintonville, in the county of Waupaca and State of Wisconsin, have invented certain new and useful Improvements in Power-Applying Mechanism; and we do hereby declare the following to be a full, clear, and exact description of the invention, such as will enable others skilled in the art to which it appertains to make and use the same.

Our invention relates to new and useful improvements in power-applying mechanism and more particularly to that class adapted to be used in connection with motor-propelled vehicles, such as automobiles, or the like, and our object is to provide a mechanism of this class whereby the power may be applied to both the front and rear axles.

A further object is to provide a suitable clutch mechanism for applying the power from the driving shaft to the propelling shaft and a still further object is to provide means for differentiating the speed of the propelling shafts.

Other objects and advantages will be hereinafter referred to and more particularly pointed out in the claim.

In the accompanying drawings which are made a part of this application, Figure 1 is a side elevation of a portion of the vehicle frame showing our improved power-applying mechanism applied to use. Fig. 2 is a sectional view on an enlarged scale through the power-applying mechanism. Fig. 3 is a detail sectional view of that form of power applying mechanism used in connection with steam engines.

Referring to the drawings in which similar reference numerals designate corresponding parts throughout the several views, 1 and 2 indicate the supporting wheels of the vehicle and 3 and 4 indicate, respectively, the supporting axles of the vehicle.

It has been the custom, heretofore, to apply the power to the rear axles only of the automobiles, but it is our intention to apply the power to both the rear and front axles, and to this end, therefore, we provide a propelling shaft 5, which extends horizontally through bearings 6 in a housing 7, said shaft having at its opposite ends universal joints 8 and 9, respectively, to which are secured pitmen 10 and 11, respectively, said pitmen extending from the propelling shaft 5 to the axles 3 and 4, where they are secured by means of universal joints 12 and 13 to auxiliary propelling shafts 14 and 15, respectively, said auxiliary shafts having on their outer ends bevel pinions 16 and 17, respectively, which mesh with bevel gears 18 and 19 on the axles 3 and 4, and by which means said axles are driven, said pinions and gears being preferably inclosed within an oil-tight casing, thereby reducing the friction between the pinions and gears by keeping the casing filled with oil.

Secured to the propelling shaft 5, between the bearings 6, is a high and low speed gear 21 and 22, respectively, which are fixed to the propelling shaft 5 in any preferred manner, and with which are adapted to mesh a friction gear 23 and a sliding gear 24, respectively.

Mounted in suitable bearings 25 in the upper end of the housing 7, immediately above the gears 21 and 22 and parallel with the propelling shaft 5, is a driving shaft 26.

Fixed to the shaft 26 and adjacent one of the bearings 25 is a sleeve 27, one end of which is provided with a head 28, with which one face of the friction gear 23 is adapted to engage, while the opposite side of the gear 23 is adapted to be engaged by a friction plate 29, said plate being loosely mounted on the sleeve 27 and provided with a beveled projection 30, which is adapted to engage a beveled recess 31 in one face of the friction gear 23, the opposite face of said bevel gear being provided with a similar recess 32, in which the head 28 is adapted to take, the peripheral edge of the head 28 being likewise beveled to engage the beveled wall of the recess 32, and it will be seen that when pressure is applied to the outer face of the friction plate 29, the gear 23 will be rigidly clamped between the beveled projection 30 and head 28, thereby fixing the gear on the sleeve 27, but that said friction gear will remain idle when not engaged by the friction plate and head.

Adjustably mounted upon the sleeve 27 adjacent the outer face of the plate 29, is a spider 33, to which are pivotally secured clutch dogs 34, one of the ends of each of which is adapted to engage the outer face of the plate 29, the pivotal points 35 of the clutch dogs being adjacent this end of the dogs.

The opposite ends of the dogs are formed into arms 36, the end faces 37 of which are beveled to engage the bevel end 38 of a bell-cone 39, said cone being adapted to move longitudinally on the sleeve 27 and engage and separate the arms 36, which will result in forcing the opposite ends of the clutch dogs 34 into engagement with the plate 29.

The sliding gear 24 is mounted upon the shaft 26, between one of the bearings 25 and head 28 and is caused to rotate with said driving shaft in any preferred manner, as by means of a feather 40, and by properly connecting the sliding gear 24 and cone 39, said gear will be moved out of engagement with the gear 22 when the cone is moved into engagement with the arms 36.

By this construction it will be seen that a high or low speed may be obtained, as, when the gear 21 is being driven through the medium of the friction gear 23, a high speed will be produced and, likewise, when the gear 22 is being driven by the sliding gear 24, a low speed will result.

In Fig. 3 of the drawings we have shown our preferred form of power transmitting device to be used in connection with steam engines, and, in this instance, the extra speed changing gear is dispensed with, as the speed of the engine may be controlled by the volume of steam used, although this form of mechanism may be used in connection with gas, or other classes of motors by attaching thereto the usual, or well-known form of speed changing gears.

When using the mechanism in connection with steam motors, the propelling shaft is made in two sections 76 and 77, the meeting ends of which are squared and introduced into a socket in a differential gear 78 and, as this gear is old and forms no particular part of our invention, further description thereof is deemed unnecessary.

A driving shaft 79 is located above the differential gear 78 and has fixed thereon a sleeve 80, said sleeve having a head 81 at one end thereof, which is fixed to a coupling 82 by means of a bolt, or the like 83.

Loosely mounted upon the sleeve 80 and adapted to mesh with the differential gear 78 is a friction gear 84, having in one face thereof a circular channel 85, the side walls of said channel being flared outwardly to receive a tapered friction ring 86, carried by a friction plate 87, said plate being likewise loosely mounted upon the sleeve 80 and on the opposite side of the friction gear from the head 81, so that said gear will be held between the flange and friction plate.

The plate 87 is operated in the same manner as the plate 29, clutch dogs 88 being mounted upon an adjustable spider 89 carried by the shaft 79, said shaft being threaded as shown at 90, so that the spider may be adjusted to or from the plate 87.

A cone 91 similar to the cone 39 is employed for directing the clutch dogs into engagement with the plate 87, so that when the cone is moved inwardly on the driving shaft 79, the curved ends of the clutch dogs 88 will force the plate 87 into engagement with the friction gear 84 and firmly clamp the friction gear between the plate 87 and head 81, thereby causing the gear 84 to rotate the driving shaft 79.

It will thus be seen that we have provided very efficient means for driving both the front and rear axles of a vehicle, thereby increasing the speed of the vehicle and at the same time distributing the strain equally between the two axles.

What we claim is:

A device of the character described, comprising a driven shaft, a driving shaft, a fixed sleeve on the driving shaft provided with a headed member, a pinion loose on said sleeve, a friction plate slidable on said sleeve to engage the pinion, a spider in threaded engagement with said sleeve whereby it may be adjusted with relation to the friction plate, dogs pivotally connected to said spider in engagement with said plate, and a pinion on the driven shaft to mesh with the pinion loose on the sleeve.

In testimony whereof we have signed our names to this specification in the presence of two subscribing witnesses.

OTTO ZACHOW.
WILLIAM BESSERDICH.

Witnesses:
  W. A. OLEN,
  VALBERG OLEN.